May 15, 1923.
A. B. WATKINS
COMBINED FISHING AND SWAGING TOOL
Filed March 17, 1922
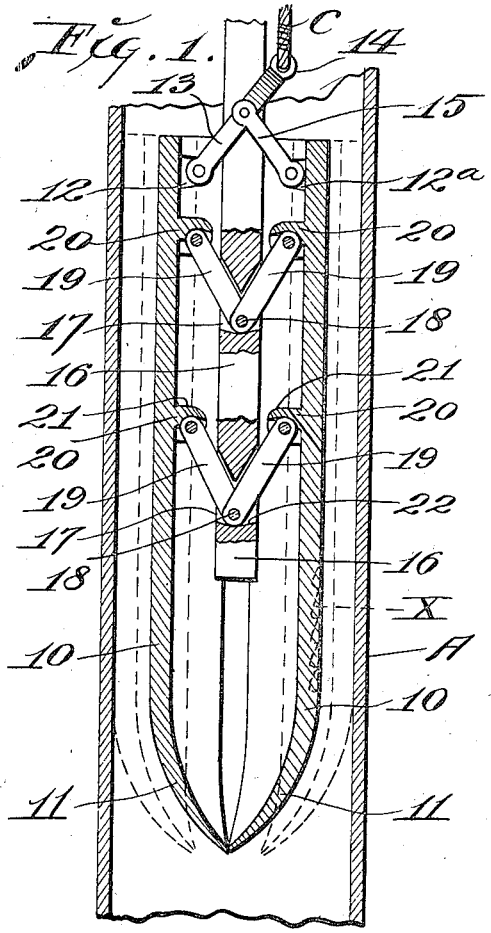
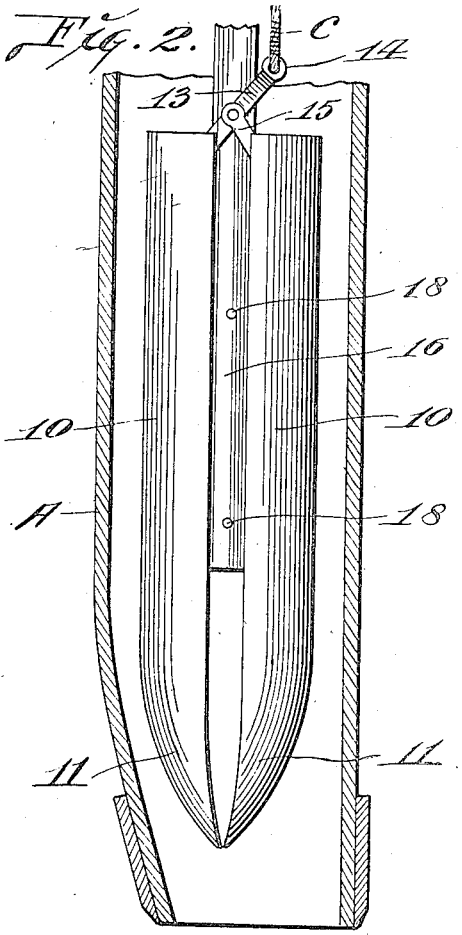
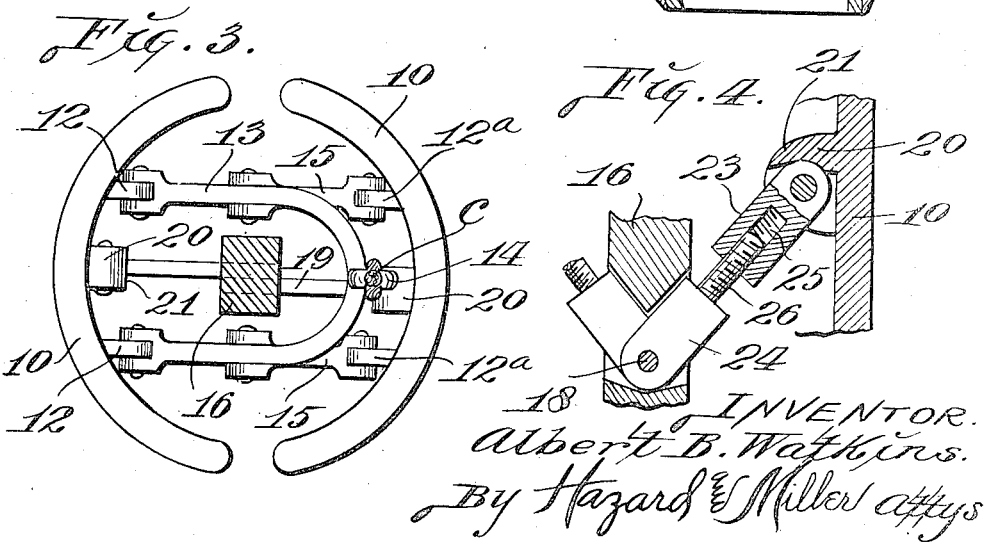
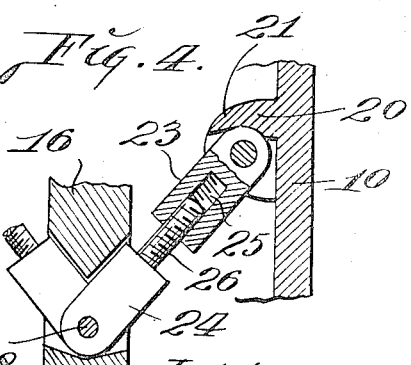
INVENTOR.
Albert B. Watkins.
By Hazard & Miller attys Patented May 15, 1923.

1,455,314

UNITED STATES PATENT OFFICE.

ALBERT B. WATKINS, OF ALHAMBRA, CALIFORNIA.

COMBINED FISHING AND SWAGING TOOL.

Application filed March 17, 1922. Serial No. 544,451.

*To all whom it may concern:*

Be it known that I, ALBERT B. WATKINS, a citizen of the United States, residing at Alhambra, in the county of Los Angeles and State of California, have invented new and useful Improvements in Combined Fishing and Swaging Tools, of which the following is a specification.

My invention relates to a combined fishing and swaging tool that is adapted to be used for the removal of casings from well holes and for swaging casings that have become bent or indented while being placed in the well hole.

The principal objects of my invention are to generally improve upon and simplify the construction of the existing forms of combined fishing and swaging tools, to provide a tool that is expansible diametrically in order that it may be utilized for fishing for and elevating casings of different diameters, to provide a tool of the character described that may be easily and cheaply produced which is capable of being readily manipulated during fishing or swaging operations.

With the foregoing and other objects in view, my invention consists in certain novel features of construction and arrangement of parts that will be hereinafter more fully described and claimed and illustrated in the accompanying drawings, in which—

Fig. 1 is a vertical section taken through the center of a portion of a well casing and showing my improved fishing tool positioned therein.

Fig. 2 is a vertical section of the lower end portion of a casing that is bent or collapsed and showing my improved tool positioned within said casing for the purpose of swaging the casing and restoring the bent portion thereof to its normal condition.

Fig. 3 is an enlarged top plan view of my improved fishing and swaging tool.

Fig. 4 is a detail section of a modified form of one of the link connections between one of the members of the tool and the lifting bar.

Referring by numerals to the accompanying drawings which illustrate a practical embodiment of my invention, 10, 10 designate identical parts that cooperate to form the body of the tool, each of said parts comprising an elongated body of metal that is approximately semi-circular in cross section and the two bodies are vertically disposed with their convex faces outwardly presented.

The lower portions 11 of the bodies 10 are curved inward so that when said bodies are properly assembled they form practically an elongated cylinder that tapers to a blunt point at its lower end. Such construction permits the tool to readily enter and pass downwardly through a casing or section of well tubing such as A.

Hinged to a pair of ears 12 that project inwardly from the upper portion of one of the body members 10 is a bail shaped member 13, the outer end thereof being provided with an eye or loop 14 to which is secured the lower end of a section of cable C that is utilized in lowering the tool into a well hole and the casing therein.

Pivotally connected to the intermediate portions of the legs of the bail shaped member 13 are the upper ends of links 15, the lower ends thereof being pivotally connected to ears 12ª that are identical with the ears 12 and which project inwardly from the body member 10 opposite the member where the ears 12 are formed.

Obviously when the tool is suspended by means of cable C, bail 13 and links 15 occupy the inclined positions shown in Fig. 1 and with the body members 10 in collapsed position, that is, arranged immediately adjacent to each other so that the terminal portions of the inwardly curved lower ends 11 bear directly against each other. When so arranged the tool may be inserted into a tube or casing that has an internal diameter slightly greater than the external diameter of the body of the tool and the parts 10 that form the body of the tool are capable of being expanded or moved away from each other so as to firmly grip and engage the inner surface of a larger tube or casing.

The means utilized for expanding the parts of the tool comprise a metal rod or bar 16 of indefinite length and the lower portion of which extends downwardly into the chamber between the parts 10. Formed through the lower portion of bar 16 are two or more transverse slots 17 and extending into said slots and pivotally arranged upon pins 18 that are seated in said bar 16 are the lower ends of links 19, the upper ends of the latter being pivotally connected to ears 20 that project inwardly from the members 10. These ears 20 are provided at their upper ends with inwardly projecting lugs 21 which overlie the corresponding ends of the links 19 and said lugs performing the functions of stops to limit the upward swinging of the links 19.

The lower ends of the slots 17 are provided with slightly inclined faces 22 which are adapted to serve as stops for the lower or inner end portions of the links 19 and to prevent the same from swinging above the horizontal plane occupied by their upper points of pivotal connection when the tool is expanded to its limit.

In Fig. 4 I have shown an adjustable form of link between the bar 16 and body members 10, said adjustable construction comprising an upper link member 23 that is pivotally connected to ear 21 and the lower link member 24 is pivotally connected to bar 16. Link member 23 is provided with an internally threaded bore 25 that receives a threaded shank 26 on link 24. Obviously, to adjust the length of this link it is necessary to detach one of the link members from the body 10 or from the rod 16 and when this is done the detached part may be rotated so as to screw the shank 26 into or out of the threaded bore 25 and consequently lengthening or shortening the distance between the points of pivotal connection of the link members.

When my improved device is used as a fishing tool for the removal of a broken section of a well casing, the tool suspended by cable C is lowered into the well until it enters the upper end of the broken section of the casing. While the tool is thus being lowered into the well and into the broken casing said tool will remain in collapsed condition by reason of the fact that the weight of said tool and the bar 16 is carried by the cable C and while so suspended the bail 13 and links 15 occupy the positions as illustrated in Figs. 1 and 2.

When the tool has been positioned in the upper portion of the broken casing, bar 16 is engaged and drawn upwardly thereby transferring the weight of the tool from cable C to said bar 16 and at the same time said cable is permitted to slacken to such a degree as to enable the tool to be readily manipulated. As bar 16 is drawn upward the inner lower ends of the pairs of links 18 will be drawn upward with the result that the body portions 10 of the tool will be moved away from each other until their outer faces are in contact with the inner surface of the casing and continued upward pull on the bar 16 will tightly clamp the members 10 against the inner surface of the casing so that when sufficient lifting power is applied to the bar the broken section of casing will be elevated and lifted from the well hole.

If desired, the external faces of the members 10 may be transversely ribbed or corrugated as shown by dotted lines X, Fig. 1, and which construction provides a series of teeth or shoulders that are effective in gripping the inner surface of the casing.

In placing a well casing into a well hole it sometimes happens that the lower end of the casing engages an obstruction such as a heavy stone and as a result the lower end of the casing is partially collapsed as shown in Fig. 2. It is desirable that the circular shape of the casing be maintained throughout its length so that when the lower end is thus bent or partially collapsed my improved tool may be used as a plunger for swaging the bent portion of the casing back to proper shape. To effect the swaging operations the tool is elevated by means of the cable C to a point a short distance above the bent portion of the casing and the cable is suddenly released to permit the tool to drop and in so doing it strikes with considerable force against the bent portion of the casing and these operations, repeated, will in short time restore the casing to its normal circular contour.

A combined fishing and swaging tool of my improved construction is comparatively simple, may be easily and cheaply produced and is very effective in performing its intended functions.

It will be understood that minor changes in the size, form and construction of the various parts of my combined fishing and swaging tool may be made and substituted for those herein shown and described without departing from the spirit of my invention, the scope of which is set forth in the appended claims.

I claim as my invention:

1. In a combined fishing and swaging tool, a pair of elongated channel shaped members arranged parallel with each other and the lower ends of said members being curved inwardly toward each other, and an inclined bail which is directly connected with one of said channel-shaped members and linked to the other of said channel-shaped members.

2. In a combined fishing and swaging tool, a pair of elongated channel shaped members arranged parallel with each other and the lower ends of said members being curved inwardly toward each other, and pivotally connected links and an inclined bail connecting said members.

3. In a combined fishing and swaging tool, a pair of elongated channel shaped members arranged parallel with each other with their convex faces outwardly presented, a bar extending downwardly between the upper portions of said members, and links pivotally connected to said bar and to said members, and an inclined bail which is directly connected with one of said channel-shaped members and linked to the other of said channel-shaped members.

4. In a combined fishing and swaging tool, a pair of elongated channel shaped members arranged parallel with each other with their convex faces outwardly presented, a bar extending downwardly between the upper portions of said members, links pivotally connected to said bar and to said members, a bail shaped member pivotally connected to the upper end of one of said elongated members, and links connecting said bail shaped member with the other elongated member.

5. In a combined fishing and swaging tool, a pair of elongated channel shaped members arranged parallel with each other and with their convex faces externally arranged, a bail shaped member pivotally connected to the upper end of one of said elongated members, links connecting the other elongated member with said bail shaped member, and pairs of links pivotally connected to each other and to said elongated members.

6. In a combined fishing and swaging tool, a pair of elongated channel shaped members arranged parallel with each other and with their convex faces externally arranged, a bail shaped member pivotally connected to the upper end of one of said elongated members, links connecting the other elongated member with said bail shaped member, pairs of links pivotally connected to each other and to said elongated members, and a bar connected to the inner ends of said pivotally connected links.

In testimony whereof I have signed my name to this specification.

A. B. WATKINS.